United States Patent
James et al.

(10) Patent No.: US 6,609,181 B2
(45) Date of Patent: Aug. 19, 2003

(54) MEMORY MANAGEMENT UNIT WITH PROGRAMMABLE EDAC DESCRIPTORS

(75) Inventors: Robert Ward James, Albuquerque, NM (US); Arthur Howard Waldie, Albuquerque, NM (US)

(73) Assignee: Goodrich Corporation, Charlotte, NC (US)

( * ) Notice: Subject to any disclaimer, the term of this patent is extended or adjusted under 35 U.S.C. 154(b) by 142 days.

(21) Appl. No.: 09/829,141

(22) Filed: Apr. 9, 2001

(65) Prior Publication Data

US 2001/0044889 A1 Nov. 22, 2001

Related U.S. Application Data

(60) Provisional application No. 60/203,201, filed on May 11, 2000.

(51) Int. Cl.[7] .............................................. G06F 12/00
(52) U.S. Cl. ...................... 711/156; 711/154; 711/206; 714/764
(58) Field of Search ................................. 711/154, 156, 711/206; 714/52, 746, 758, 764, 766, 800, 805

(56) References Cited

U.S. PATENT DOCUMENTS

| | | | | |
|---|---|---|---|---|
| 5,307,477 A | * | 4/1994 | Taylor et al. ................. | 711/3 |
| 5,361,249 A | * | 11/1994 | Monastra et al. ............ | 370/217 |
| 5,530,823 A | * | 6/1996 | Tsuchiya et al. ............ | 711/207 |
| 5,956,753 A | * | 9/1999 | Glew et al. .................. | 711/205 |
| 6,161,208 A | * | 12/2000 | Dutton et al. ................ | 714/764 |
| 6,363,502 B1 | * | 3/2002 | Jeddeloh ...................... | 714/52 |
| 2002/0065646 A1 | * | 5/2002 | Waldie et al. ................ | 703/26 |
| 2002/0147955 A1 | * | 10/2002 | James et al. ................. | 714/758 |

FOREIGN PATENT DOCUMENTS

JP   2000137995   * 4/2000

* cited by examiner

*Primary Examiner*—Hong Kim
(74) *Attorney, Agent, or Firm*—David R. Percio; Calfee, Halter & Griswold LLP

(57) ABSTRACT

A memory management unit (MMU) of a digital processing system operating in a virtual address domain and a physical address domain comprises a memory programmable to store translation mappings between virtual addresses and physical addresses of the processing system. The memory is also programmable to store control codes representative of EDAC protection corresponding to the translation mappings. A method of operating the memory management unit (MMU) comprises the steps of: programming a memory of the MMU with virtual to physical address translation mappings; and programming the memory of the MMU with control codes representative of EDAC protection corresponding to the translation mappings.

16 Claims, 2 Drawing Sheets

| | VIRTUAL | R | E | PHYSICAL |
|---|---|---|---|---|
| 44 — | 0 0 0 0 | | 0 | 0 0 0 0 |
| 46 — | 0 0 0 1 | 1 | 1 | 0 0 0 1 |
| 48 — | 0 0 0 2 | | 0 | 0 0 0 3 |

| | |
|---|---|
| RTOS EEPROM WITHOUT EDAC | 0 |
| USER 1 RAM WITH EDAC | 1 |
| SPARE RAM WITH EDAC | 2 |
| I/O MEMORY WITHOUT EDAC | 3 |

MMU MAP TABLE

| SECTION | MSB 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | LSB 0 |
|---|---|---|---|---|---|---|---|---|---|---|---|---|---|---|---|---|---|---|---|---|---|---|---|---|---|---|---|---|---|---|---|---|
|  | SECTION BASE ADDRESS |||||||||||||| R ||| E |||||||||||||
| PAGE | PAGE TABLE BASE ADDRESS |||||||||||||||||||||| E ||||| R |||

40 — SECTION
42 — PAGE

Fig. 2

| VIRTUAL | R | E | PHYSICAL |
|---|---|---|---|
| 0 0 0 0 | 0 | 0 | 0 0 0 0 |
| 0 0 0 1 | 1 | 1 | 0 0 0 1 |
| 0 0 0 2 | 0 | 0 | 0 0 0 3 |

| RTOS EEPROM WITHOUT EDAC | USER 1 RAM WITH EDAC | SPARE RAM WITH EDAC | I/O MEMORY WITHOUT EDAC |
|---|---|---|---|
| 0 | 1 | 2 | 3 |

Fig. 4

MEMORY MANAGEMENT UNIT WITH PROGRAMMABLE EDAC DESCRIPTORS

This application claims priority from U.S. Provisional Application Ser. No. 60/203,201 filed May 11, 2000.

BACKGROUND OF THE INVENTION

The present invention is directed to memory management units of a digital processing system, in general, and more particular, to a memory management unit (MMU) which includes programmable descriptors corresponding to segmented portions of physical memory to indicate whether or not each segmented memory portion is protected by error detection and correction (EDAC) codes.

In most modem digital processing systems, digital words are comprised of many bytes, i.e. 8-bit sections. For example, most microprocessor systems today operate with 32 bit words. The more powerful ones operate with 64 bit words. As the bits per word increase, so does the chance of an error occurring during storage and transmission of these lengthy words between processing sections. Some systems have added error detection and correction (EDAC) codes to the digital words that are stored and transferred with them for checking at the transfer destination. Generally, with these type codes, the processor may detect and correct a single error in the transmitted word and detect multiple errors to provide an indication of bad received data. But not all external devices or input/output (I/O) devices coupled to a processor should be required to have the capability to generate and check EDAC codes. Accordingly, some devices may have EDAC capability and others not. Mixing EDAC capable devices with those that are not EDAC capable cause complex problems at the system design level and may also impact system performance and cost.

Currently, the processing systems that use EDAC codes, but also have devices that do not support EDAC capability, generally require that the processor turn off or deactivate the EDAC checking circuitry when communicating with non EDAC supporting devices. The overhead required for the processor to reactivate the EDAC circuitry become burdensome and deactivating the EDAC circuitry removes the protection of the code while a data transfer is performed to a non-EDAC protected device. Systems that require writing to devices that have less than the width of one word, for example a byte wide device in a 32-bit bus system, are generally required to have EDAC protection down to the smallest accessible transfer width, usually one byte. This type of protection is costly from a monetary, power consumption and board real-estate perspective. Systems that use a single EDAC code consisting of one or more bits to cover a multi-byte word are severely impacted in performance when operating on sub-word transfers. In such systems, since the EDAC code applies to the entire multi-byte word, sub-word operations can not be performed with the EDAC circuitry activated without additional hardware or software resource added to the system to perform these operations.

The processor should make the determination of the type of EDAC protection to apply, based on system design parameters. If the EDAC code is not generated and attached by the processor and the device can process EDAC codes, then the system runs the risk of an error in transmission. On the other hand, when the external device is the source of transmission, the processor should know if the EDAC code is valid, (i.e. the external device can generate EDAC code).

One solution could be to make all external devices and memory systems capable of generating and checking EDAC codes, but this would lead to an expensive system overall. On the other hand, by offering the ability to segment EDAC protection functionality across a complete system address space, costs may be significantly reduced by not forcing EDAC protection onto address sections that do not inherently require the additional protection. One example of a system that may not require EDAC protection is a serial interface that has a built in protection system in data supplied in the form of a cyclic redundancy check (CRC) error correcting code. A more cost effective solution for moving data of this type would be to transfer the data with peripheral systems that do not have EDAC protection and to place the data into an EDAC protected memory internally to the processing system. Once the data is in the protected memory, it can be evaluated for errors and corrected using its own CRC codes. The resulting data would then be protected and maintained in a fault protected environment using EDAC codes built on the memory. The problem with placing devices within the processor system that support EDAC and other fault tolerant features in different ways should be solved without impacting performance, flexibility and operational capability of the system.

The present invention is intended to provide a processing system that has the flexibility of performing EDAC protection over various segmented sections of memory space. Such a processing system allows maximum performance at a lower cost by permitting a mix of both EDAC and non-EDAC protected devices located within a common memory space of the system.

SUMMARY OF THE INVENTION

In accordance with one aspect of the present invention, a memory management unit (MMU) of a digital processing system operating in a virtual address domain and a physical address domain comprises a memory programmable to store translation mappings between virtual addresses and physical addresses of said processing system; said memory also programmable to store control codes representative of EDAC protection corresponding to the translation mappings.

In accordance with another aspect of the present invention, a method of operating a memory management unit (MMU) of a digital processing system operable in both virtual and physical address domains wherein the method comprises the steps of: programming a memory of the MMU with virtual to physical address translation mappings; and programming the memory of the MMU with control codes representative of EDAC protection corresponding to said translation mappings.

BRIEF DESCRIPTION OF THE DRAWINGS

FIG. 2 is an illustration of lines of code of a translation look-up table suitable for use in the MMU of FIG. 1.

FIG. 3 is a more detailed functional example of a portion of the look-up table of the MMU.

FIG. 4 is an example of a definition of the memory of external devices suitable for use with the embodiment of FIG. 1.

DETAILED DESCRIPTION OF THE INVENTION

Figure 1:
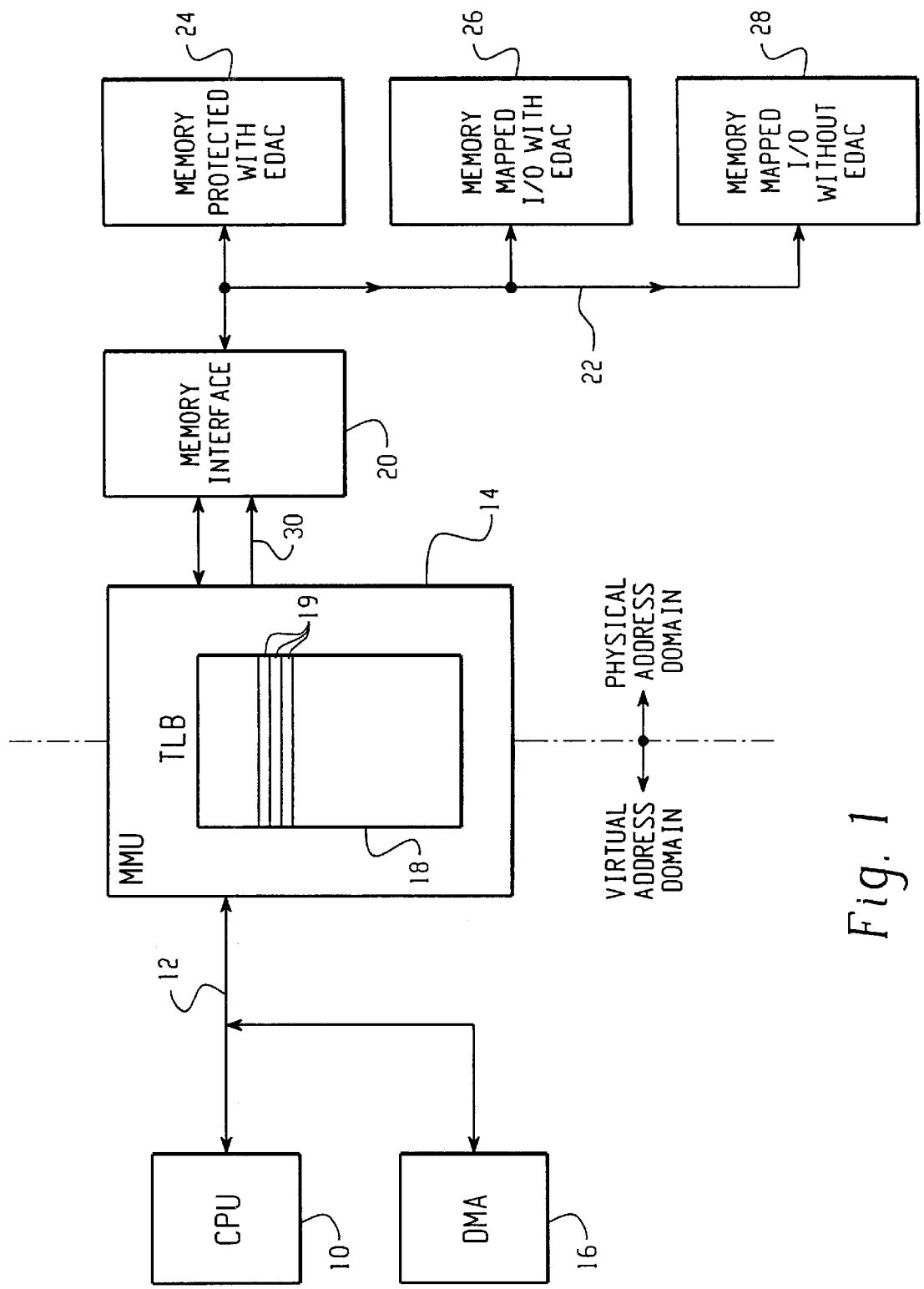
FIG. 1 is a block diagram schematic of a processing system including a memory management unit (MMU) suitable for embodying the principles of the present invention.

Referring to FIG. 1, a central processing unit (CPU) 10 is coupled over a processor bus to a memory management unit (MMU) 14. Other bus master type devices internal to the processing system, like a direct memory access (DMA) controller 16, for example, may also be coupled to the processor bus 12 for communicating with the MMU 14. Both of the CPU and DMA perform their respective tasks in the virtual address domain. Programmed into a memory of the MMU 14 is a translation table which may be buffered locally in a translation look-aside buffer or TLB 18 which includes all the necessary translations between virtual memory and physical memory needed by the processing system in lines of digital code 19 thereof.

Generally, the system designer is aware of the external devices coupled to the processing unit as part of the architectural design of the system and will assign physical addresses to each. Thereafter, the designer may determine what physical memory of the external devices is correspondingly associated with what virtual memory of the processor. This one-to-one mapping of virtual address to physical address for each external device is stored in the memory of the processor and programmed into the TLB 18 of the MMU 14 in the lines of digital code 19 normally during boot-up of the system. Once activated, the MMU 14 will accept virtual addresses from the CPU, DMA controller and other bus devices and translate them into their corresponding physical addresses of the external devices. So, if the CPU wants to write a digital word out to an external device under program control, it need only supply the virtual address of the destination memory register and the MMU 14 handles the translation to physical memory according to the pre-mapped TLB 18 of the MMU 14. This physical address may be passed through a memory interface 20 which is coupled to the MMU 14 and on to an external bus 22 that carries the address to its destined external device. The present embodiment, by way of example, includes three such external devices, namely an external memory 24 with the capabilities of EDAC code protection, a memory that maps the I/O devices 26 with EDAC protection and another external memory that maps I/O devices 28 without EDAC code protection, all coupled to the external bus 22.

If the access task to the MMU is a write operation, a data word and control bits will also be conducted over the external bus 22 to the accessed external device memory register for writing therein. And if the access task to the MMU 14 is a read operation, then control bits will be conducted over the bus 22 to the accessed register and the digital word contents thereof conducted back to the processor over the same bus 22. In the present embodiment, the memory interface 20 is responsive to control signals over lines 30 to control the passage of sections of the digital words between the processor and bus 22. These word sections may be bytes, for example, and each byte then would have a control line to permit passage of the byte to or from the processor on to the bus 22.

According to the present invention, the MMU 14 has EDAC protection capabilities to the extent that it may perform an EDAC code operation by causing the generation and attachment of an EDAC code to digital words passed on to an external device when it identifies that the external device has EDAC protection capabilities. Another EDAC code operation that the MMU may perform includes causing the analysis of a digital word received from an external device and checking its EDAC code when it identifies that the external device has EDAC protection capabilities. To this end, a programmable descriptor is preprogrammed into the translation table 18 of the MMU 14 with each translation line of code 19 thereof. In the present embodiment, the descriptor is in the form of a digital bit that is set to a binary one or a high state if the external device has EDAC protection capabilities and set to a binary zero or a low state if not. Note that the code of each translation line 19 of the translation table 18 of the MMU may be reprogrammed at any time if there is a change in assignment, e.g. if a new physical address is assigned to a virtual address or if there is a change in the external device which maintains its current address, but changes its EDAC protection capability. Accordingly, the MMU 14 need only check the EDAC descriptor of a translation line to identify whether or not to perform an EDAC code operation for the corresponding access task.

FIG. 2 exemplifies the contents of the lines of code 19 of the MMU translation table 18 in greater detail. Referring to FIG. 2, in the present embodiment, the virtual address effectively points to or accesses a line of code 19 in the MMU translation table 18. Also, in the present embodiment, each line of code 19 includes 32 bits of code. In one line type shown at 40, the translation is effected for a section of memory which may be on the order of one megabyte, for example. The physical base address of the designated section is found in digital bit locations 20 through 31 of the line. Also programmed as part of the line of code at bit 9, for example is the EDAC descriptor E. Accordingly, if E is set, the MMU will perform an EDAC code operation; otherwise, it will not.

The processor of the present embodiment is also capable of writing out to external devices such as 24, 26 and 28, for example, digital information that is less than a digital word in length. This information may be in the form of a byte or one-half word, i.e. 16 bits if the word length is 32 bits. If the EDAC descriptor E is set, then if a portion of the word in external memory is altered, i.e. a byte or half-word is changed, the EDAC code thereof should be corrected in order to maintain the integrity of the EDAC protection. To accomplish this in the present embodiment, a second bit descriptor R is programmed into each coded line 19 of the table 18 as shown in the line 40 of FIG. 2 in digital bit 12, for example. If this R bit is set, the MMU 14 is alerted to a partial word change in a physical address of an external device. If the E bit is also set, the MMU 14 responds to cause a read/modify/write operation to be performed on the partially altered digital word at the designated physical address. A read/modify/write operation includes the steps of reading into the processor the contents of the data at the designated physical address, modifying the byte or one-half word values in the accessed digital word and generating an EDAC code therefor, and writing back into the designated physical memory the digital word and its new EDAC code. This operation will be performed each time the MMU 14 identifies that both bits E and R are set for a translation access task.

Another example of a line of code in the table 18 is shown at line 42 in FIG. 2. This line permits a translation to a page of physical memory of an external device. A page of memory may contain on the order of one kilobyte of memory, for example. Line type 42 permits a finer addressing resolution for the base address of the page encompassing bits 10 through 31. In this type line example, the programmable E bit and R bit descriptors are found at digital bits 9 and 3, respectively.

FIGS. 3 and 4 are illustrations for use in describing an example of operation of the present embodiment. FIG. 4 illustrates an exemplary definition into pages, sections or a combination thereof with physical base memory addresses of 0,1,2 and 3. The block of memory at base memory address 0 includes the contents of a real time operating system software of the processor in electrically erasable programmable read only memory (EEPROM) without EDAC code protection; the block of memory at address 1 includes digital word random access memory (RAM) storage for USER 1 with EDAC protection; the block of memory of address 2 is a spare RAM with EDAC protection and the block of memory at address 3 includes an I/O memory without EDAC protection.

FIG. 3 illustrates functionally only the salient portions of programmed translation lines 19 of the translation table 18. In operation, if the virtual address 0000 is supplied to the MMU for an access task, the MMU will access line 44 of the table to obtain the physical address of the external device which happens to be 0000, the same as the virtual address. The MMU 14 will also examine the E and R bits of the coded line 44, in this case since E is not set or a binary zero, no EDAC protection will be perform for the access task. If another virtual address 0001 is presented to the MMU, it will access coded line 46 to obtain the corresponding physical address. In this case the E bit is identified as being set, therefore, the MMU will perform EDAC protection for the immediate access task. In addition, since the R bit is also identified as being set, the MMU will perform a read/modify/write operation on the digital word contents of the physical address 0001 whenever a write to the area is performed for contents less than a full word width. Note that for the virtual address 0002, the assigned physical address coded line 48 is not 0002, but rather 0003 which includes I/O device mapped memory. Physical memory 0002 is left as a spare for possible use in the future, e.g. to replace physical memory addressed at 0001 if it fails.

In summary, all external devices, including memory and I/O devices are memory mapped in the translation table of the MMU. To efficiently apply EDAC protection to digital word transfers between the processor and the external devices only when preferred, an EDAC status code or bit is programmed in each translation line of the MMU table. Additionally, the processor has the capability of setting and resetting the EDAC status bit as appropriate. In addition, this aspect of the present invention permits the processor to use EDAC codes for checking during self-test operations. Accordingly, the present invention is particularly applicable to those processing systems which are architecturally designed with different areas of memory having different EDAC protection, e.g. a mix of radiation hardened memory that may not include EDAC protection used with other low cost memory that may include EDAC protection and/or scrubbing. In the present embodiment, since EDAC protection is designed to protect the entire word or 32 bits, and allows for writing data to sub-word areas of the same memory areas, for example, then when the processor performs sub-word write operations, the control bit R in the corresponding translation line of the MMU table indicates that a read/modify/write operation to update the word and its EDAC code properly should be performed for each sub-word write operation to this section of memory. In this manner the integrity of the EDAC code is protected over the entire 32 bit word. External devices that have sub-word lengths and can not be read are signaled by having the R bit set to zero thereby preventing the read/modify/write operation when accessing the memory area. In cases such as these, the sub-word may be copied throughout the 32 bit word. For example, for a byte operation, all four bytes of the word are filled with the same binary value, and for a one-half word operation, the upper and lower portions of the word are filled with the same binary value. In any event, the EDAC code is generated to cover the entire 32 bit word and sent out with the word to an external device. The external device may or may not use the associated EDAC code during this type of write operation.

While the present invention is described above in connection with one or more specific embodiments, it is understood that no limitations on the present invention should be implied by such embodiments. Rather, the present invention should be construed in breadth and broad scope in accordance with the recitation of the appended claims.

We claim:

1. A memory management unit (MMU) of a digital processing system operating in a virtual address domain and a physical address domain, said digital processing system coupled to a plurality of external devices, having correspondingly assigned physical addresses, for exchanging digital data therewith, some of the external devices of said plurality having error correction and detection (EDAC) code protection capabilities and others of which having no EDAC code protection capabilities, said MMU operative to perform EDAC code processing on the digital data exchanged between the external devices and digital processing system, said MMU including:

a memory programmable to store translation mappings between virtual addresses of said processing system and physical addresses of the external devices coupled thereto, wherein the digital processing system is operative to exchange digital data with a selected external device of said plurality based on a corresponding translation mapping; said memory also programmable to store in an assigned storage location of each translation mapping a control code representative of the EDAC protection capability of the external device corresponding to said translation mapping; and means for causing the MMU to perform an EDAC code processing operation on the digital data exchanged with said selected external device based on the control code of the corresponding translation mapping.

2. The MMU of claim 1 wherein the memory includes a plurality of registers which are programmable with assigned physical addresses corresponding to virtual address translations; and wherein each register includes a programmable EDAC protection control code.

3. The MMU of claim 2 wherein the EDAC protection control code comprises a binary bit.

4. The MMU of claim 2 wherein the address of each said registers of the plurality corresponds to the virtual address which is correspondingly assigned to the physical address programmed therein.

5. The MMU of claim 1 wherein the MMU includes means for causing an EDAC code operation to occur as part of a translation access task based on the status of the EDAC code for said translation.

6. The MMU of claim 1 wherein the memory is also programmable to store a control code representative of a read/modify/write operation for sub-word write translation access tasks.

7. The MMU of claim 6 wherein the read/modify/write control code comprises a binary bit.

8. The MMU of claim 6 wherein the MMU includes means for causing a read/modify/write operation to occur based on the status of the read/modify/write and EDAC codes.

9. A method of operating a memory management unit (MMU) of a digital processing system operable in both virtual and physical address domains, said digital processing system coupled to a plurality of external devices, having correspondingly assigned physical addresses, for exchanging digital data therewith, some of the external devices of said plurality having error correction and detection (EDAC) code protection capabilities and others of which having no EDAC code protection capabilities, said MMU operative to perform EDAC code processing on the digital data exchanged between the external devices and digital processing system, said method comprising the steps of:

- programming a memory of the MMU with translation mappings between virtual addresses of the processing system and physical addresses of the external devices coupled thereto;
- exchanging digital data between the digital processing system and a selected external device of said plurality based on a corresponding translation mapping;
- programming an assigned storage location of each translation mapping of the memory of the MMU with a control code representative of the EDAC protection capability of the external device corresponding to said translation mapping; and
- causing the MMU to perform an EDAC code processing operation on the digital data exchanged with said selected external device based on the control code of the corresponding translation mapping.

10. The method of claim 9 including the steps of: programming a plurality of registers of the memory with assigned physical addresses corresponding to virtual address translations; and programming each register with a programmable EDAC protection control code.

11. The method of claim 10 wherein the EDAC protection control code programmed into the plurality of registers comprises a binary bit.

12. The method of claim 10 including assigning an address to each register of the plurality that corresponds to the virtual address which is correspondingly assigned to the physical address programmed therein.

13. The method of claim 9 including causing an EDAC code operation to occur as part of a translation access task based on the status of the EDAC code programmed for said translation.

14. The method of claim 9 including programming the memory to store a control code for each translation mapping, said control code being representative of a read/modify/write operation for sub-word write translation access tasks.

15. The method of claim 14 wherein each read/modify/write control code programmed into the comprises a binary bit.

16. The method of claim 14 including causing a read/modify/write operation to occur for a translation mapping based on the status of the read/modify/write and EDAC codes programmed therefor.

* * * * *